P. P. LOCKLING & J. F. PARKER.
AUTOMATIC FARE REGISTER.
APPLICATION FILED APR. 29, 1912.

1,044,402.

Patented Nov. 12, 1912.

3 SHEETS—SHEET 1.

P. P. LOCKLING & J. F. PARKER.
AUTOMATIC FARE REGISTER.
APPLICATION FILED APR. 29, 1912.
1,044,402.
Patented Nov. 12, 1912.
3 SHEETS—SHEET 2.
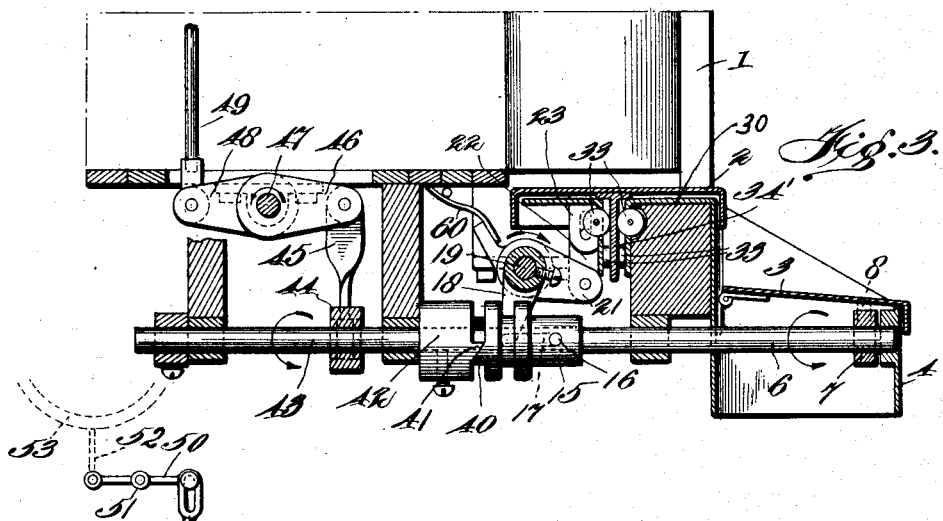
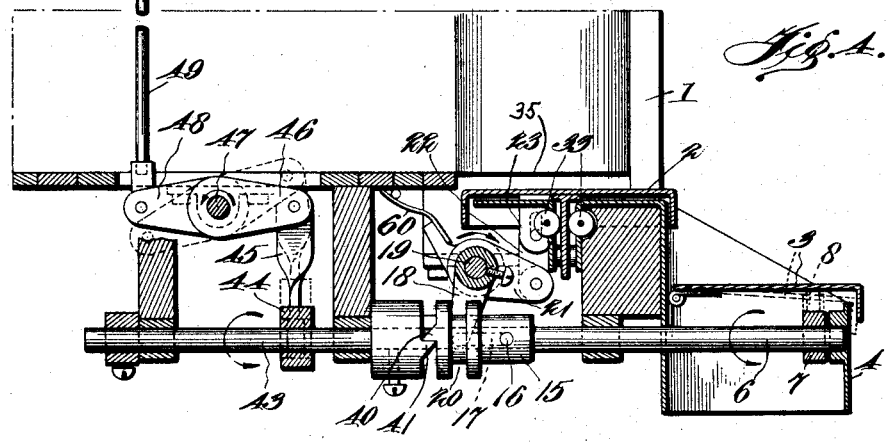
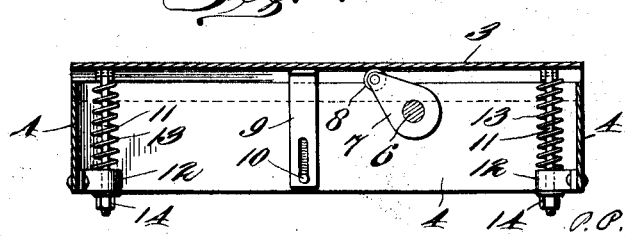

P. P. LOCKLING & J. F. PARKER.
AUTOMATIC FARE REGISTER.
APPLICATION FILED APR. 29, 1912.
1,044,402.
Patented Nov. 12, 1912.
3 SHEETS—SHEET 3.
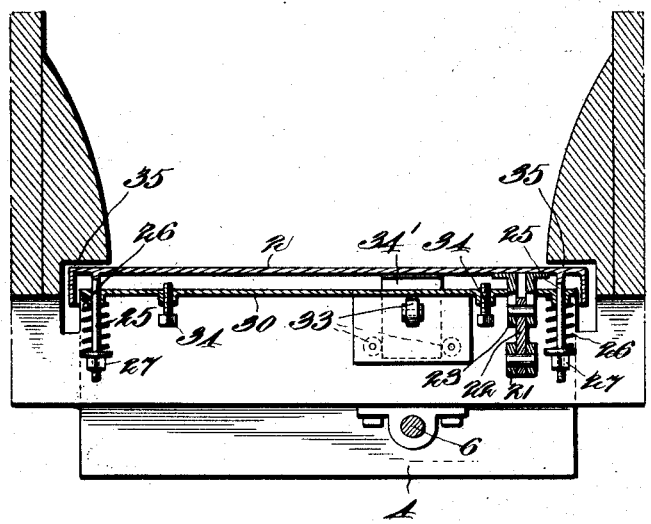
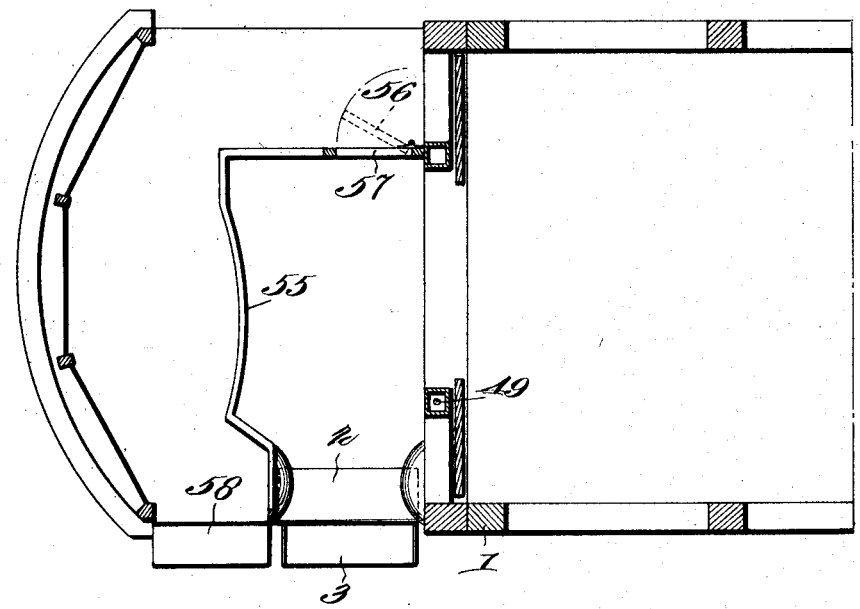

UNITED STATES PATENT OFFICE.

PAUL P. LOCKLING, OF FRUITDALE, AND JOSEPH F. PARKER, OF MOBILE, ALABAMA, ASSIGNORS TO PAUL P. LOCKLING IMPROVED AUTOMATIC PASSENGER FARE REGISTERING COMPANY, OF MOBILE, ALABAMA, A COPARTNERSHIP.

AUTOMATIC FARE-REGISTER.

1,044,402.  Specification of Letters Patent.  Patented Nov. 12, 1912.

Application filed April 29, 1912. Serial No. 693,880.

*To all whom it may concern:*

Be it known that we, PAUL P. LOCKLING and JOSEPH F. PARKER, citizens of the United States, the former residing at Fruitdale, Washington county, State of Alabama, and the latter residing at Mobile, in the county of Mobile and State of Alabama, have invented certain new and useful Improvements in Automatic Fare-Registers; and we do hereby declare the following to be a full, clear, and exact description of the invention, such as will enable others skilled in the art to which it appertains to make and use the same.

This invention relates to automatic fare registers, and has for its object to produce an efficient, simple and comparatively inexpensive means which will register each passenger only as he leaves the car; while also permitting officials and employees to leave without actuating the counting mechanism.

With these and other objects in view, the invention consists in the novel combinations and arrangements of parts more fully hereinafter disclosed and particularly pointed out in the claims.

Figure 1:
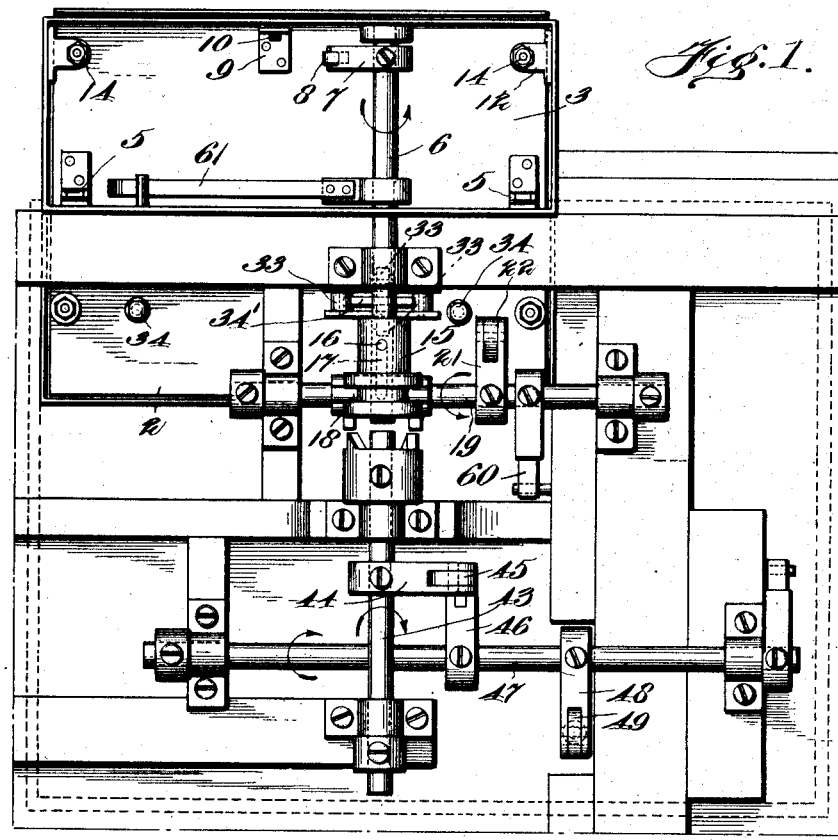
Figure 2:
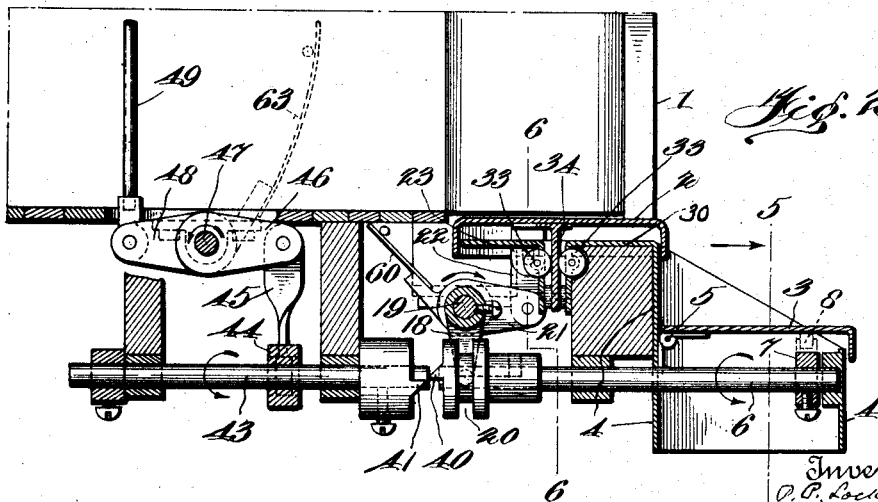

Referring to the accompanying drawings, in which like numerals designate like parts in all the views:—Figure 1 is a bottom plan view of a mechanism made in accordance with this invention; Fig. 2 is a sectional view through the platform and steps of a car, and through the fare-registering mechanism which is shown in its neutral, or non-registering position; Fig. 3 is a view similar to Fig. 2, but showing the position of the parts when a passenger is entering the car and the parts are not registering; Fig. 4 is a view similar to Fig. 3, but showing the position of the parts when a passenger is leaving the car and the parts are registering; Fig. 5 is a sectional view on the line 5—5 of Fig. 2; Fig. 6 is a sectional view on the line 6—6 of Fig. 2; and Fig. 7 is a diagrammatic sectional view showing a car platform and the means employed to permit officials and employees to leave the car without being registered.

1 indicates a car body, 2 the upper step or platform, and 3 the lower step, hinged to the framework 4 as at 5. Suitably supported in said framework, beneath the step 3, is a shaft 6, carrying an arm 7, provided with a roller 8 taking against the underside of said step 3, as best shown in Fig. 5. Extending from the step 3 are the steadying slotted guides 9 coacting with the pins 10, and the rods 11 passing through the lugs 12 on the frame 4. The rods are surrounded by the springs 13, and are provided with the adjustable nuts 14, as shown.

The shaft 6 carries near its end the clutch collar 15, slidingly secured on said shaft by the pin 16 working in the slot 17, and the arm 18 carried by the shaft 19 coacts with the groove 20 to slide said collar along said shaft 6 while permitting the collar to freely rotate with its shaft as will be readily understood. Rigid with the shaft 19 and angularly disposed with respect to the arm 18 is a second arm 21, joined by the link 22 to the slotted projection 23 extending from the upper step 2, as best shown in Fig. 6.

Also projecting from the step 2 are the rods 25, surrounded by the springs 26, and provided with the adjusting nuts 27. A stationary lower plate 30 which is a part of the framing 4 is located beneath the step 2, and receives the upward thrust of the springs 26. Said plate is also provided with anti-friction rollers 33, between which passes a steadying guide plate 34' extending from the step 2; and said plate also carries adjustable stops 34 for limiting the downward movement of the step 2. The said step preferably extends under the framework as at 35 to limit its upward movement.

From the mechanism so far described, it is evident that should a passenger enter the car, he will first depress the step 3, the roller 8, the arm 7, and turn the shaft 6 in the direction of the arrow. The turning of the shaft will also turn the clutch collar 15 in the same direction, which will prevent its actuating the register as will appear hereinafter. As the passenger next reaches the upper step 2, he will depress the slotted projection 23, link 22, turn the arm 21, the shaft 19, arm 18, and through the pin carried by said arm 18 working in the slot 20, he will cause the clutch member 15 to slide along the shaft 6 toward the left, as seen in and to occupy the position shown in Fig. 3. But, as previously stated, the clutch collar 15 having been turned into the angular position shown in Fig. 3, its movement along the shaft 6 by the step 2 will cause its clutch member 40 to miss the co-acting clutch member 41, carried by the sleeve 42 on the shaft 43, and it will therefore fail to turn said shaft 43. In other words, the depressions of the steps 3 and 2 will have brought the clutch member 40 into the position shown in Fig. 3, which is its inoperative position, and no registration will have been effected, as will be clear from what follows.

The shaft 43 carries the arm 44 to which is attached the link 45 connected to the arm 46 on the shaft 47, which shaft also carries the arm 48, to which is connected the slotted rod 49 connected to the lever 50 pivoted at 51 and adapted to actuate the rod 52 controlling the register 53.

From the mechanism now disclosed, it will be clear that, although a passenger entering the car will not actuate the register 53, yet a passenger leaving the car will cause said register to be actuated. That is to say, a passenger leaving the car will depress the step 2, as shown in Fig. 4, which will first, through the connections above described, cause the clutch member 40 to be slid along the shaft 6 and into the position shown in said Fig. 4. In this position, the engaging face of said member will be adapted to contact with the engaging face of the clutch member 41, when the said sleeve 15 is rotated. This rotation of the sleeve 15 will be immediately effected through the mechanism above described when the passenger leaves the step 2 and depresses the step 3. The rotation of the said clutch member 40, thus described, will, of course, cause the rotation of the clutch member 41 carried by the shaft 43, and thereupon rotate the said shaft 43. The rotation of the shaft 43 will through the lever 44, move the link 45 from its full line to its dotted line position, shown in Fig. 4, and will also move the said arm 46 upwardly, as indicated. The upward movement of the arm 46 will rotate the shaft 47 in the direction of the arrow, and depress the arm 48 and the rod 49. The depression of the rod 49 will pull down one end of the lever 50, and raise the other end, thus moving the rod 52 and actuating the register 53. Therefore, it will now be clear that, as a passenger enters the car, the depression of the step 3 before the step 2 will rotate the clutch member 40 out of the path of the clutch member 41, as is indicated in Fig. 3, and therefore no actuation of the register 53 will take place, although the said member 40 will be moved longitudinally of the shaft 6 by the depression of the step 2. On the other hand, if the step 2 is first depressed by the passenger leaving the car, then the subsequent depression of the step 3 will cause a registration to take place.

It is, of course, desirable that officials and employees of the car should be permitted to enter and leave the same without actuating the register 53, and for this purpose we have provided the rail 55 and the gate 56, which permits said officials to pass through the gate-way 57 around the railing 55 and out by the step 58, which does not actuate any counting mechanism. In other words, a motorman or conductor standing on the platform of a car prevents passengers from entering by way of the step 58, but permits employees and officers to enter and leave by such means.

In practice, a cover, not shown, is placed over the mechanism, and access thereto can only be had by means of a key carried by some authorized person. It therefore follows that, the invention above disclosed serves as a check on the conductor, and gives the proper official an independent record of passengers leaving the car.

In case it is desired to admit children under a certain age, the nuts 14 and 27, which respectively control the springs 13 and 26, can be so adjusted as to prevent the steps 2 and 3 from moving a sufficient distance to actuate the register, unless a predetermined weight is placed thereon. That is to say, unless a child weighs a given amount, say fifty pounds, no registration will take place, while if he weighs more than this, the registration will be effected.

The spring 60, Figs. 2, 3 and 4, serves to restore the sleeve 15 to its normal or non-registering position through the shaft and the arm 18, and the spring 61, Fig. 1, serves to turn the arm 7 to its position in contact with the step 3, as illustrated in Fig. 5. The spring 63, Fig. 2, also serves to restore the rod 49 through the shaft 47 and arm 48 to its normal or non-registering position.

It is obvious that those skilled in the art may vary the details of construction, as well as the arrangement of parts without departing from the spirit of our invention, and therefore we do not wish to be limited to the above disclosure, except as may be required by the claims.

What we claim is:—

1. In a fare register the combination of a plurality of depressible members; an oscillating shaft provided with a slidable clutch member; connections between one of said depressible members and said shaft adapted to move the same; and connections between the other of said depressible members and said slidable clutch member adapted to move the latter longitudinally of said shaft, substantially as described.

2. In a fare register the combination of a pair of shafts adapted to oscillate on their axes and placed end to end; a clutch member rigid with one of said shafts; a clutch member slidingly carried by the other shaft but oscillating therewith adapted to engage and disengage said first mentioned clutch member; and means comprising two depressible members and connections adapted when successively depressed in one order to cause the oscillation of both of said shafts, but when depressed in the opposite order to cause the disengagement of said clutch members and the oscillation of only one of said shafts, substantially as described.

3. In an automatic fare register, the combination of a pair of depressible steps, a register actuating member, and means comprising an oscillating shaft provided with a slidable clutch member, connections between one of said depressible steps and said shaft adapted to move the same, and connections between the other of said depressible steps and said slidable clutch member adapted to move the latter longitudinally of said shaft, said means adapted to operate said actuating member when said steps are depressed in one sequence, but to disengage said clutch and fail to operate said member when said steps are depressed in another sequence.

4. In an automatic fare register, the combination of a pair of depressible steps, a register actuating member, and means between said steps and said register actuating member adapted to operate the latter when said steps are depressed in one sequence, but to fail to operate said member when depressed in the opposite sequence, said means comprising an oscillating shaft associated with said register actuating member, a clutch member rigid with said shaft, a second oscillating shaft provided with a slidable clutch member adapted to engage with said first-named clutch member, connections between one of said depressible steps and said second-named shaft adapted to oscillate the same, and connections between the other of said depressible steps and said slidable clutch member adapted to move the latter longitudinally of said shaft into and out of engagement with said other clutch member.

5. In an automatic fare register the combination of a lower depressible step; an oscillating shaft; connections between said step and shaft for operating the latter; a slidable clutch member oscillating with said shaft; an upper depressible step; a second oscillating shaft; connections between said upper step and said second shaft for operating the said second shaft; connections between said second shaft and said slidable clutch member for moving said member; a register operating means; a third oscillating shaft provided with a second clutch member rigid thereon; and connections between said third shaft and said register operating means, substantially as described.

6. In an automatic fare register, the combination of a platform, upper and lower depressible steps leading to the platform, a register operating member, connections between said steps and operating member whereby said member will not be moved when said lower step is depressed before the upper step, but will be moved when said upper step is depressed before said lower step, a rigid step leading to the platform arranged alongside of said depressible steps, a railing dividing the platform, one division opening to the depressible steps, the other division to the rigid step, and a gateway in said railing for communicating between said divisions.

7. In an automatic fare register the combination of lower and upper depressible steps located in the entrance to a car; a register operating member; connections between said steps and operating member comprising a pair of oscillating shafts connected by clutch members one of which is slidingly fixed to one of said shafts whereby said member will not be moved when said lower step is depressed before the upper step, but will be moved when said upper step is depressed before said lower step; and means whereby officers and employees may leave the car without passing over said steps, substantially as described.

8. In an automatic fare register the combination of lower and upper depressible steps located in the entrance to a car; a register operating member; connections between said steps and operating member comprising a pair of oscillating shafts arranged end to end connected by clutch members one of which is slidingly fixed to one of said shafts, and a third oscillating shaft provided with connections for controlling said sliding clutch member whereby said member will not be moved when said lower step is depressed before the upper step, but will be moved when said upper step is depressed before said lower step; and means whereby officers and employees may leave the car without passing over said steps, substantially as described.

9. In an automatic fare register, the combination of a pair of depressible steps, a register actuating member, means between said steps and actuating member adapted to operate said member when said steps are depressed in one sequence, but to disengage a clutch and fail to operate said member when said steps are depressed in another sequence, said means comprising an oscillating shaft provided with a slidable clutch member, connections between one of said depressible steps and said shaft adapted to move the same, and connections between the other of said steps and said slidable clutch adapted to move the latter longitudinally of said shaft, and adjustable means to prevent the operation of said actuating member when persons less than a predetermined weight actuate said steps in any sequence.

10. In an automatic fare register, the combination of a pair of depressible steps, a register actuating member, means between said steps and actuating member adapted to operate said member when said steps are depressed in one sequence, but to disengage a clutch and fail to operate said member when said steps are depressed in another sequence, said means comprising an oscillating shaft provided with a slidable clutch member, connections between one of said depressible steps and said shaft adapted to move the same, and connections between the other of said steps and said slidable clutch adapted to move the latter longitudinally of said shaft, means to prevent the operation of said actuating member when persons less than a given weight actuate said steps in any sequence, and means for permitting authorized persons to leave the car without passing over said steps.

In testimony whereof, we affix our signatures, in presence of two witnesses.

PAUL P. LOCKLING.
JOSEPH F. PARKER.

Witnesses:
BERNARD MAY,
R. L. ORR.

Copies of this patent may be obtained for five cents each, by addressing the "Commissioner of Patents, Washington, D. C."